United States Patent [19]

Sheeks

[11] 3,913,399

[45] Oct. 21, 1975

[54] RATE-OF-FLOW METER WITH ATTACHED GENERATOR

[76] Inventor: Oliver P. Sheeks, 141 W. Brookshire, Orange, Calif. 92665

[22] Filed: July 8, 1974

[21] Appl. No.: 486,610

[52] U.S. Cl. .................................. 73/229; 73/198
[51] Int. Cl.² ............................................ G01F 1/10
[58] Field of Search ...... 73/198, 214, 229; 335/222, 335/229

[56] References Cited
UNITED STATES PATENTS

| 211,572 | 1/1879 | Hinden | 73/229 |
| 3,447,373 | 6/1969 | McNabb | 73/229 |
| 3,845,291 | 10/1974 | Portyrata | 73/229 X |

Primary Examiner—Richard C. Queisser
Assistant Examiner—John S. Appleman

[57] ABSTRACT

An improved turbine type of rate-of-flow meter with attached generator is devised by implementation of several novel features. The device employs a low-friction rotary fluid seal for minimizing frictional torques and maximizing the torque-producing force of several nozzles which are located at the periphery of a turbine or jet wheel. A unique use of an inlet Venturi designed for compatibility with the nozzles creates a condition of zero pressure drop across a fluid gap thus fulfilling mathematically derived requirements for the low-friction rotary fluid seal. Coupling of jet wheel and generator is accomplished by complimentary magnets located across an isolator plate. A common permanent-magnet type motor is used as the generator, the accompanying magnetic slot effects being compensated by properly disposing the ferrous materials circumferentially to the generator.

8 Claims, 6 Drawing Figures

VIEW A-A

VIEW B-B

RATE-OF-FLOW METER WITH ATTACHED GENERATOR

BACKGROUND OF INVENTION

Energy conservation needs have prompted the requirement for an economical means of determining the rate-of-flow of liquid fuels. A direct means commonly used for obtaining rate-of-flow information is to place a turbine in the line and utilize the kinetic energy of the fluid to produce rotation of the turbine's shaft which may be connected either by direct shaft or by magnetic coupling to a generator which thereby provides a voltage proportional to the rate of flow. This means of obtaining rate-of-flow information is limited to flow having sufficient kinetic energy to overcome the friction inherent in the use of rotary seals and bearings which may be necessary to facilitate the design. In some applications involving low flow rates, such as in the determination of rate-of-flow of fuel for vehicles or small marine craft, the pressure drop necessary at the turbine in order to provide the required torque to overcome the friction is prohibitive since the pressure drop would starve the engine. Further, to provide for economy of design the generator employed in this application must be inexpensive. An example of such a generator is a permanent magnet motor being used for the purpose of providing a voltage proportional to the rate of rotation of its shaft. However, this type of generator has a limitation in that a detent or slot action exists at angular positions corresponding with each of its several magnetic poles. For instance, a six pole permanent magnet motor or generator has six equally spaced angular positions in each revolution of the shaft which will stall the shaft if the driving torque is below a minimum level. The slot effect is equivalent to that of friction in that additional pressure drop is required at the turbine to overcome these parasitic torques.

SUMMARY OF DISCLOSURE

The present invention relates generally to rate-of-flow meters and more particularly to an improved meter which overcomes the limitations caused by friction and magnetic slot torques experienced by conventional flow meters. The invention embodies a combination of novel features providing a means of determining the rate of flow of liquid fuel typical of vehicular or small marine craft applications, as disclosed in Document Disclosure No. 027365 dated Jan. 14, 1974. The invention is provided with a turbine hereinafter referred to as a jet wheel, whose function of providing rotary motion proportional to flow rate is aided at low flow rates by the additional provisions of a low-friction rotary fuel seal and low friction bearings, which consist of a pin shaft bearing and a magnetically seated point bearing. This function is further aided by magnetically coupling the generator shaft to the jet wheel through a non-ferrous wall, thus eliminating the need for a rotary seal between the jet wheel and generator. Furthermore, the invention is provided with a magnetic detent or slot compensator which serves to minimize parasitic magnetic torques inherent in permanent magnet type generators. This is accomplished by the placement of ferrous material angularly between the slot positions so that additional magnet fields will be created with the driven or coupling magnets effectively doubling the number of slot positions, but thereby reducing the magnitude of the peaks of the parasitic torque.

The principle objective of the invention is to provide an improved rate-of-flow meter which utilizes a jet wheel magnetically coupled to a generator for the purpose of producing a voltage which is proportional to flow rate commonly expressed in gallons per hour.

A further objective is to measure lower flow rates with less pressure drop than possible with conventional turbine-generator type flow meters.

Another objective of the invention is to maximize the transmissible torque at the jet wheel by utilizing a low-friction fluid seal created by the unique use of a Venturi constriction equalizing pressures across the rotary joint separating the inlet fluid from the outlet fluid. The pressure drop required to facilitate the low-friction rotary seal is recovered by the Venturi's exit tube of diffuser located immediately downstream from the rotary joint thus providing a low-friction fluid seal without sacrifice of line pressure loss.

A further objective of the invention is to minimize parasitic slot torques at the generator by utilizing a compensator of ferrous material which aids in overcoming slot torques by magnetic attraction of the generator shaft coupling magnets.

Other objectives and advantages of the invention will become better understood hereinafter from a consideration of the specification with reference to the accompanying drawings forming part thereof, and in which like numerals correspond to like parts throughout the several views of the invention, and wherein.

Figure 5:
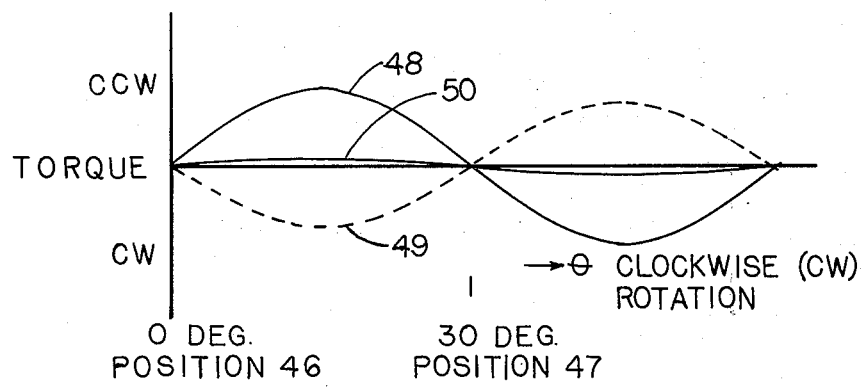

FIG. 5 shows a simplified sinusoidal plot of slot torque applied to the generator shaft throughout one revolution. Also shown in the plot is the compensator torque as applied to the shaft. The substantially zero torque plot represents the sum of slot and compensator torques in a compensated system.

Figure 6:
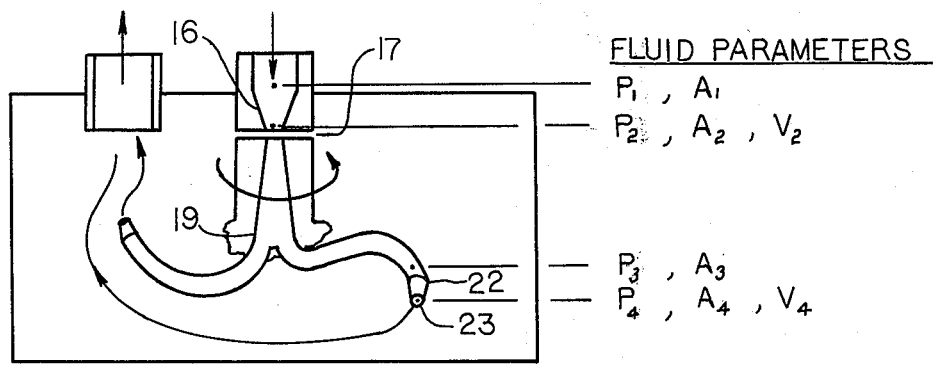

FIG. 6 is a simplified flow pictorial of the meter for illustrating fluid pressure, area, and velocity relationships used in the derivation of an equation defining requirements for the zero-friction rotary fluid seal.

SPECIFICATION OF THE DISCLOSURE

Figure 2:
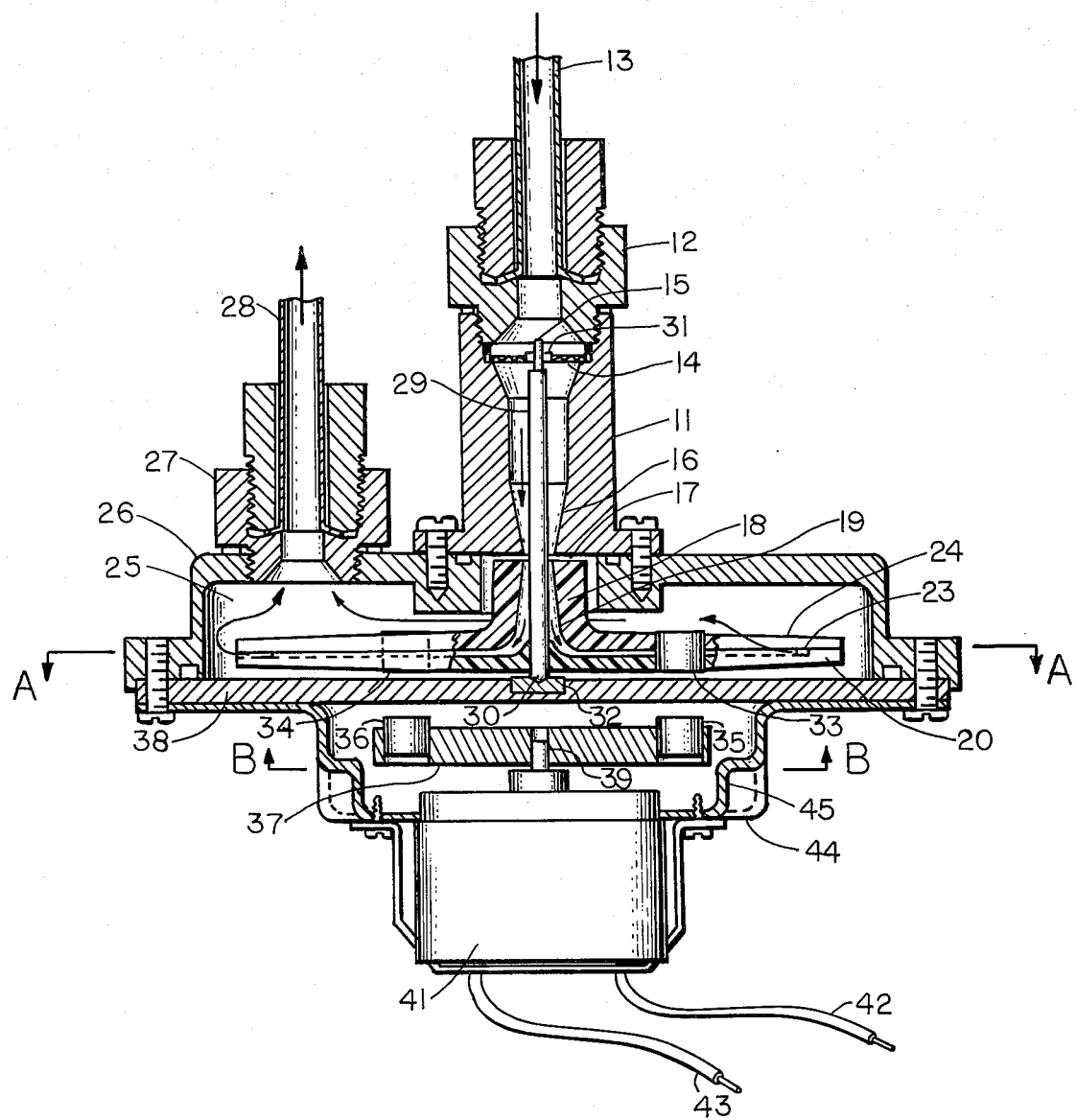
FIG. 2 is a vertical sectional view of the rate-of-flow meter, with a cutaway section of the jet wheel showing the Venturi's exit tube, driving magnets, one of the jet nozzles at the periphery of the jet wheel and the unsectionalized generator.

Referring to the drawing, the present invention, designated as 10, comprises a Venturi entrance tube 11 to which tubing adapter 12 is attached for the purpose of providing a standard adaptation for inlet tube 13. Upon application of positive pressure in said inlet tube 13, fluid enters said Venturi entrance tube 11 through the attached combined filter and pin shaft bearing 14 (FIG. 2) whose function is to filter out particles having dimensions larger than the narrowest constriction in the meter and to provide a low friction bearing and a support for pin shaft 15. The fluid is subsequently forced through Venturi constriction 16 wherein the fluid velocity is increased and fluid pressure is thus decreased to facilitate the requirements for low-friction rotary seal 17, which is elaborated upon later in the specification.

Figure 1:
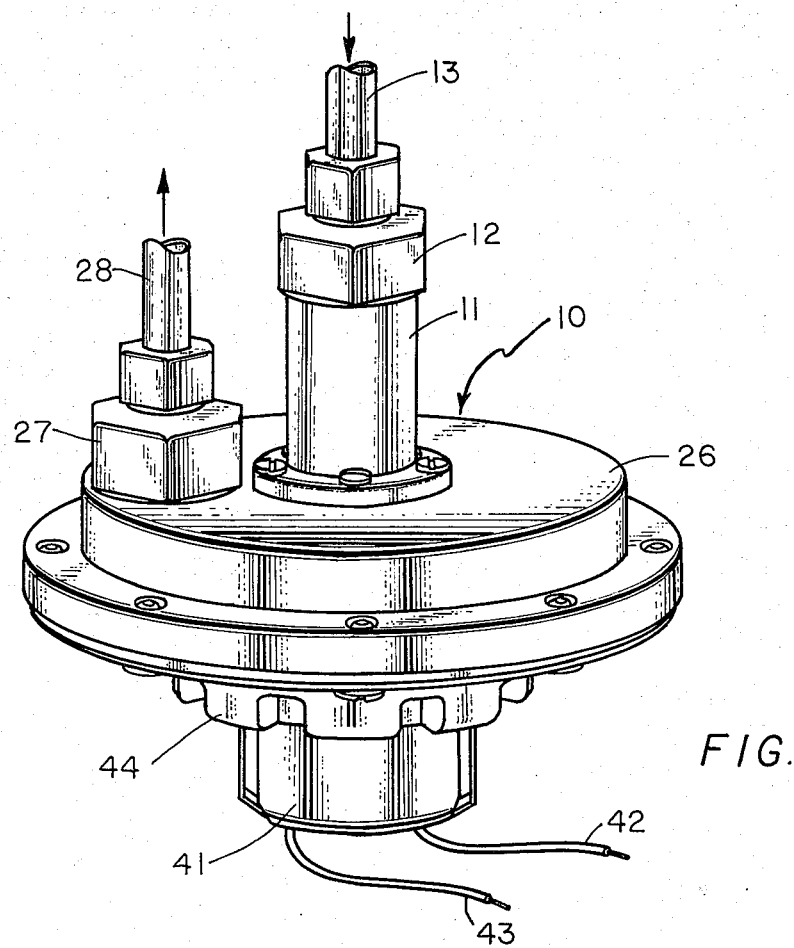
FIG. 1 is a perspective view of the invention in its normal operating orientation with respect to vertical.
Figure 3:
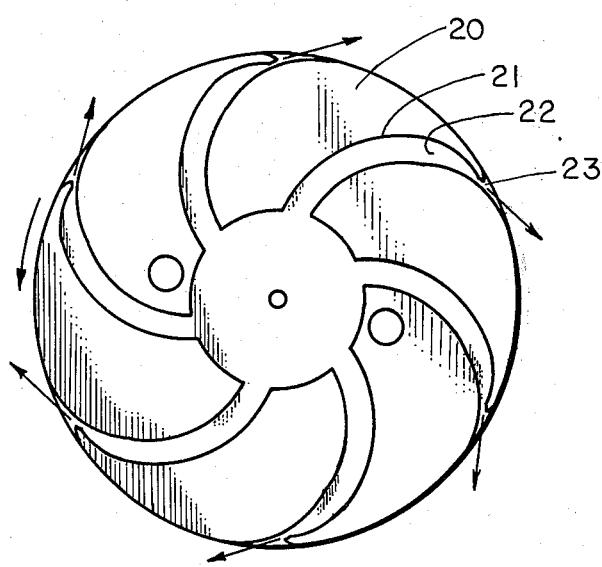
FIG. 3 is a sectional view of the lower portion of the jet wheel taken at A—A, showing arrangement of the fluid paths and nozzles which provide for jet action tangential to the wheel, thereby resulting in rotary motion opposite to the direction of flow at the nozzle exits.

The Venturi expansion plate or diffuser 18 receives the fluid exiting said Venturi entrance tube 11 and causes the fluid velocity to decrease, thus increasing the fluid pressure at the lower portion of diffuser 19 to recover most of the pressure drop occurring at the lower part of the Venturi constriction 16. The Venturi expansion plate 18 is attached to jet disc 20 forming a top cover for curved slots 21 and nozzle section 22 (FIG. 3) which respectively guide the fluid radially outward and increase the fluid's velocity before the fluid exits the torque jet 23, causing a force to be exerted approximately tangential to the jet wheel assembly 24. The fluid thus enters the outlet chamber 25 formed by housing 26 and subsequently exits the rate-of-flow meter through attached tubing adapter 27 and outlet tube 28.

Figure 4:
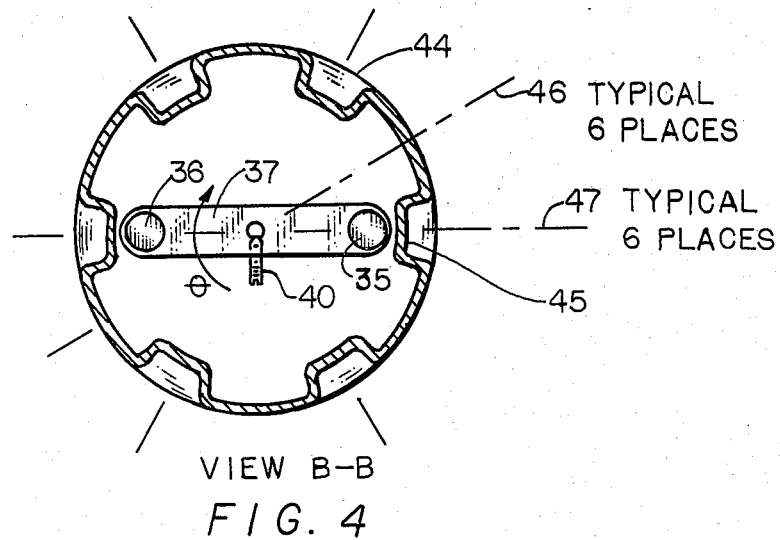
FIG. 4 is a sectional view taken at B—B, showing the generator shaft-coupling magnets and the angular relationship of the slot compensators with respect to the magnetic slot positions of the generator.

The action of the torque jet 23 creates an increase in fluid velocity to increase the pressure drop across the nozzle and consequently increase the torque exerted upon the said jet wheel assembly 24. The jet wheel assembly is supported by support shaft 29 suitably attached at the mid point of jet disc 20. The support shaft embodies pin shaft 15 and point bearing 30 which are supported respectively by pin shaft bearing 31 and point bearing seat 32. Said jet wheel assembly 24 includes Alnico driving magnets 33 and 34 which magnetically couple to Alnico driven magnets 35 ]nd 36 attached to coupler 37 located outside the lower portion of the fluid chamber which is closed off by a nonferrous isolator plate 38. Said coupler 37 is attached to generator shaft 39 by screw 40 (FIG. 4) for the purpose of transmitting rotary motion of the coupled driving and driven magnets to the generator 41, thereby providing a voltage between conductors 42 and 43 which is proportional to the rotational speed of the jet wheel assembly 24 and thereby proportional to the rate of flow of the fluid.

Although the lowest friction design is facilitated by implementation of the above features, still further improvement permitting the jet wheel to turn at even lower flow rates is provided by implementation of ferrous coupler housing 44, wherein slot compensators 45 are integral to the housing structure. Thus, said coupler housing structure has a dual purpose of positioning said generator 41 and thereby positioning attached coupler and magnets with respect to the jet wheel assembly 24 and of providing magnetic attraction of driven magnets 35 and 36. Normal slot action of the generator shaft occurs at each magnetic slot angular position(s) 46. For the particular generator application illustrated there are six such slot angular positions. The ferrous compensators 45 located as shown at compensator angular position(s) 47 serve to compensate the slot action. An idealized plot of uncompensated slot torque 48 (FIG. 5, which shows torque plotted on the ordinate and clockwise, as viewed from above, rotation of the coupler along the abscissa) shows the parasitic torque acting upon the generator shaft without the use of said compensators. Also, a plot of compensating torque 49 shows the effect of compensators 45 upon the generator shaft by their magnetic attraction of the driven magnets 35 and 36. The combined or additive effect of magnetic slots and compensators is shown in the plot of compensated slot torque 50. As shown, proper compensator design minimizes parasitic slot torque. This allows usage of the more economical type of generators which exhibit relatively large slot torques.

The parameters illustrated in FIG. 6 for establishment of a low-friction rotary fluid seal 17 are derived as follows:

$$P_1 - P_2 = C_2 W \frac{V_2^2}{2g} \left[ 1 - \left(\frac{A_2}{A_1}\right)^2 \right] \qquad \text{Eqn. (1)}$$

$$P_3 - P_4 = C_4 W \frac{V_4^2}{2g} \left[ 1 - \left(\frac{A_4}{A_3}\right)^2 \right] \qquad \text{Eqn. (2)}$$

Where $P_1$, $P_2$, $P_3$ and $P_4$ are pressures at the points illustrated in FIG. 6, which are at Venturi entrance tube 11, Venturi constriction 16, nozzle entrance 22 and torque jet 23 respectively; $C_2$ and $C_4$ are dimensionless discharge coefficients associated with the Venturi and nozzle sections respectively, $w$ is the specific weight of the fluid, $V_2$ and $V_4$ are fluid velocities at the Venturi constriction and torque jet respectively, and $A_1$, $A_2$, $A_3$, and $A_4$ are the fluid cross sectional areas at Venturi entrance, Venturi constriction, nozzle entrance, and torque jet respectively.

For the condition that $P_2 = P_4$, wherein the fluid pressure radially across the rotary seal is equalized, the fluid will flow from the Venturi constriction 16 across the rotary joint and into the diffuser 19 with minimum loss, or gain, of fluid radially across the gap. For a Venturi exitting into an ideal diffuser, the pressure $P_1$ is fully recovered making $P_3 = P_1$. Also, because continuity of flow requires that all the fluid passing through the Venturi must pass through the nozzles, then $V_2 A_2 = n V_4 A_4$, where $n$ is the number of nozzles. These three important relations are restated as follows:

$$P_2 = P_4$$
$$P_3 = P_1$$

$$V_2 = n V_4 \frac{A_4}{A_2}$$

Combining these relations with equations (1) and (2) yield the basic design equation.

$$C_2 n^2 \left(\frac{A_4}{A_2}\right)^2 \left[ 1 - \left(\frac{A_2}{A_1}\right)^2 \right] - C_4 \left[ 1 - \left(\frac{A_4}{A_3}\right)^2 \right] = 0 \qquad \text{Eqn. (3)}$$

Upon satisfying equation (3) for zero condition, the conditions for providing a low-friction rotary seal are met since $P_2$ then equals $P_4$ reducing the flow radially through the gap to substantially zero.

I claim:

1. A rate-of-flow meter with attached generator, comprising:
   a tubing adaptor means to receive the inlet fluid from a standard pipe and expand the fluid for proper reception by a filter; a fluid filtering means disposed immediately downstream from said adaptor means for restricting passage of foreign particles which are large enough to clog the meter, a pin shaft bearing means disposed midstream at an upstream end of an entrance tube for retaining a jet wheel assembly composed of a rotating jet wheel support shaft and a rotating jet wheel at the longitudinal centerline of said tube, a Venturi tube pressure reducing means whereby fluid velocity is increased by fluid convergence to locally reduce the pressure at exit end of said Venturi tube to approximate the fluid pressure in an outlet chamber surrounding a jet wheel assembly thereby effecting a low-friction rotary fluid seal means in the radial gap between said Venturi tube and said jet wheel assembly, wherein said low-friction rotary fluid seal functions substantially as a seal because of low fluid pressure differential radially across said gap from said inlet stream to said outlet chamber, said low pressure differential condition producing maximum metering efficiency being inherent in the meter design upon sizing of flow tube elements to satisfy said design by equation $$C_2 n^2 \left(\frac{A_4}{A_2}\right)^2 \left[1 - \left(\frac{A_2}{A_1}\right)^2\right] - C_4 \left[1 - \left(\frac{A_4}{A_3}\right)^2\right] = 0$$

where $C_2$ and $C_4$ are Venturi and nozzle discharge coefficients respectively, $n$ represents the number of nozzles utilized in the design, and $A_1$, $A_2$, $A_3$ and $A_4$ are respective cross sectional areas of the inlet tube, Venturi constriction, nozzle entrances, and jet openings; said jet wheel assembly embodying a fluid diffuser means for recovering fluid pressure lost in said upstream pressure reducing means prior to delivery of fluid to downstream and radially disposed nozzles at substantially the original inlet pressure; said jet wheel assembly also embodying a set of $n$ torque producing means disposed radially at the periphery of a jet disc and aligned to direct the jet stream substantially tangential to said jet wheel assembly and in the horizontal plane of the jet wheel assembly; a combined shaft coupling and bearingseating means provided by a pair of magnets disposed at equal radial distance from said support shaft in said jet wheel assembly and a complimentary pair of magnets embodied in a generator shaft coupler located opposite a non-ferrous isolator plate, the magnetic strength and lateral displacement of said magnets being sufficient to provide the coupling torque required to make the generator shaft follow the -et wheel assembly rotation, additionally the magnetic strength being sufficient to provide positive downward seating force of the point bearing in a point bearing seat and to consequently maintain positive clearance in said fluid gap maintaining said low-friction rotary fluid seal, a voltage generating means attached to said coupler thereby providing an output voltage which is substantially proportional to the rate of flow of fluid through the meter, said voltage generating means being provided with and acted upon by a magnetic slot compensator means disposed peripherally from the shaft end of the generator whereby torque retardation caused by magnetic slot effects within the generator is substantially compensated magnetically to allow the rate-of-flow meter to function at lower flow rates than otherwise practical.

2. A rate-of-flow meter with attached generator as defined in claim 1, wherein said fluid filtering means is a wire screen having maximum passage dimensions smaller than the minimum dimension associated with downstream areas within the meter, and wherein said pin shaft bearing means is a washer-like bearing suspended mid-stream by said screen, thereby offering a minimum restriction to the flow.

3. A rate-of-flow meter with attached generator as defined in claim 1, wherein said pressure reducing means is a Venturi type of construction imposing an approximate 20° convergence angle upon the fluid by the disposition of said rotating support shaft along the longitudinal centerline.

4. A rate-of-flow meter with attached generator as defined in claim 1, wherein said diffuser means for recovering fluid pressure lost in said upstream pressure reducing means is a gradually diverging tube which contains said support shaft disposed along the longitudinal centerline, said diffuser means flares radially at its lower end to extend said diffuser means outward by and toward the nozzles.

5. A rate-of-flow meter with attached generator as defined in claim 1, wherein said torque producing means is a set of $n$ nozzles designed to produce maximum torque on said jet wheel by design of nozzle entrance and exit cross-sectional areas $A_3$ and $A_4$ for compatibility with said areas $A_1$ and $A_2$ to satisfy the equation $$C_2 n^2 \left(\frac{A_4}{A_2}\right)^2 \left[1 - \left(\frac{A_2}{A_1}\right)^2\right] - C_4 \left[1 - \left(\frac{A_4}{A_3}\right)^2\right] = 0$$

and thereby establishing pressure conditions required to maintain said low-friction rotary seal means.

6. A rate-of-flow meter with attached generator as defined in claim 1, wherein said combined shaft coupling and bearing seating means is provided by attraction of complimentary pairs of Alnico magnets separated vertically by sufficient clearance to provide minimum seating force on said point bearing seat consistent with torque and dynamic environment requirements, the upward attraction on said driven magnets further allowing the generator thrust bearing to float for minimum induced friction.

7. A rate-of-flow meter with attached generator as defined in claim 1, wherein said voltage generating means is a six-pole permanent magnet motor being utilized as a generator, wherein are disposed six magnetic slots equally spaced throughout 360° of rotation of the shaft, and wherein external sealing by the coupler housing eliminates the use of the generator seals.

8. A rate-of-flow meter with attached generator as defined in claim 1, wherein said magnetic slot compensator means is a set of six indentations in said ferrous coupler housing, each indentation located between a pair of magnetic slots and equally spaced from each pair of magnetic slots such that said driven magnets, when rotated slightly from said magnetic slots, are attracted toward the ferrous indentations in a manner to substantially compensate the magnetic slot effects therein.

* * * * *